May 29, 1956 D. M. LIPKIN 2,748,296
VARIABLE DELAY LINE NETWORK
Filed March 4, 1955 3 Sheets-Sheet 1

INVENTOR
DANIEL M. LIPKIN

BY Charles C. English
AGENT

INVENTOR
DANIEL M. LIPKIN
BY Charles C. English
AGENT

VARIABLE DELAY LINE NETWORK

Filed March 4, 1955 3 Sheets-Sheet 3

INVENTOR
DANIEL M. LIPKIN

BY Charles C. English
AGENT 2,748,296
Patented May 29, 1956

2,748,296

VARIABLE DELAY LINE NETWORK

Daniel M. Lipkin, Philadelphia, Pa., assignor to Sperry Rand Corporation, a corporation of Delaware Application March 4, 1955, Serial No. 492,116
20 Claims. (Cl. 307—88)

The present invention relates to pulse type amplifiers, and is more particularly concerned with a novel amplifier disposition utilizing a variable delay line as a basic portion thereof.

Amplifiers are of course employed in many forms of electronic circuits, and such amplifiers normally comprise vacuum tube circuitry. In an attempt to overcome certain of the disadvantages accompanying the use of such circuitry, such as difficulty in packaging, and extensive maintenance requirements, other forms of amplifier devices have been suggested, including magnetic amplifiers. The present invention provides an amplifier structure exhibiting the ruggedness and other favorable characteristics of such magnetic amplifiers and, in essence, utilizes a variable delay line structure in achieving these advantages.

In accordance with the present invention, therefore, a delay line structure may be arranged to exhibit a first predetermined delay in the absence of an input controlling signal, and to exhibit a second predetermined delay in the presence of such an input controlling signal. Such a variable delay line may be energized at its input by a source of regularly occurring power pulses, and the output of the said delay line may be selectively fed to a utilization network. In practice, the said utilization network may comprise a power operated gate, whereby the said gate is open only during preselected time intervals. The variation in delay time effected by applying controlling signal inputs to the overall system thereby causes the output of the delay line to be fed to the said gating device during time periods when it is either open or closed, whereby both complementing and non-complementing amplifier operation may be achieved.

It is accordingly an object of the present invention to provide a novel amplifier.

A further object of the present invention resides in the provision of an amplifier utilizing a variable delay line as a portion thereof.

A still further object of the invention resides in the provision of novel variable delay line structures.

Still another object of the present invention resides in the provision of an amplifier utilizing a delay line, which amplifier is more rugged in configuration and less subject to operating failures than other forms of amplifiers used heretofore.

A still further object of the present invention resides in the provision of a power driven variable delay line capable of acting as an amplifier.

A still further object of the present invention resides in the provision of a selective gating device employing a variable delay line as a portion thereof.

The foregoing objects, advantages, construction and operation of the present invention will become more readily apparent from the following description and accompanying drawings, in which.

Figure 1:
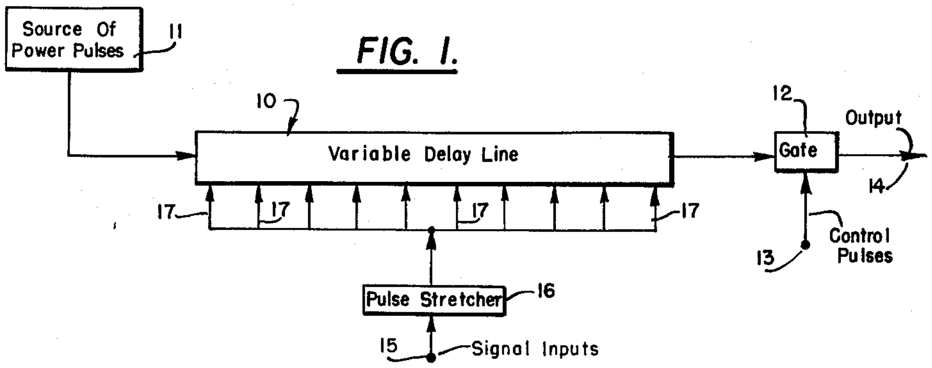
Figure 1 is a schematic diagram of one form of delay line amplifier in accordance with the present invention.

In accordance with the present invention, a variable delay line structure is employed, and this structure is regularly energized by a source of power pulses at its input. The output of the said delay line is coupled to a gating device which is also supplied by a source of control signals causing the gating device to be open only during preselected time intervals. Signal inputs coupled to the said delay line vary the delay time of that line, thereby determining whether or not power pulses traveling down the line will emerge therefrom during a time interval when they can pass through the said gating device and be utilized in a utilization circuit.

It should be noted that in providing an amplifier of the type thus contemplated in the present invention, one may obtain the highest degree of constancy of the time at which the leading edge of a power pulse appears at an output point, by arranging that that time is independent of a signal input. In accordance with one embodiment of the present invention, therefore, the signal inputs have an inhibitory function only, and desired outputs are obtained from the system in the absence of such an input. As will be described subsequently, the system may also be arranged to provide outputs in response to the presence of an input signal; and in this respect, the signal input again does not operate directly upon the source of power pulses but merely varies the delay time parameter to control the time at which power pulses are fed to a utilization circuit.

The delay lines to be discussed include inductance sections, and these delay lines may take the form of either lumped parameter lines or continuous lines. In accordance with the present invention, the desired change in delay time of a line using such inductances may be effected by either decreasing or increasing the inductance of the line in response to the presence of a signal. The particular delay line shown in Figure 1, for instance, operates upon the principle that outputs appear from the line, during time intervals when they may be utilized, in the absence of a signal input to the said line. In this respect, moreover, the inductance of the line is decreased by an input signal, whereby the line delay is similarly decreased by the said input signal to cause signals to emerge from the line during time intervals when they cannot be so utilized.

Examining the structure of Figure 1, it will be seen that a delay line amplifier, in accordance with one form of the present invention, therefore utilizes a variable delay line 10, which may be of a structure such as will be described subsequently. The delay line 10 is energized by a source of regularly occurring power pulses 11 of the pulse configuration shown in Figure 2A, and the output of the said delay line 10 is coupled to an input of a permissive type gate 12, of well known construction. The gate is also power operated from a source 13 of control pulses, which may take the configuration shown in Figure 2D; and the output of the overall amplifier system appears selectively at a terminal 14. As will be seen from a comparison of Figures 2A and 2D, the source of power pulses and the source of control pulses may in fact comprise a single source, inasmuch as these pulses are of the same configuration and timing. The actual delay time of the line 10 is varied by a source of controlling signal inputs 15, coupled via pulse stretcher 16, to a plurality of points 17 on the line. In the particular example shown in Figure 1, a plurality of such controlling points 17 have been shown since a lumped parameter delay line, for instance of the type shown in Figures 6 and 8, has been assumed. If a continuous delay line, for instance of the type shown in Figure 7, is employed, the particular representation of Figure 1 will be modified accordingly.

Figure 2:
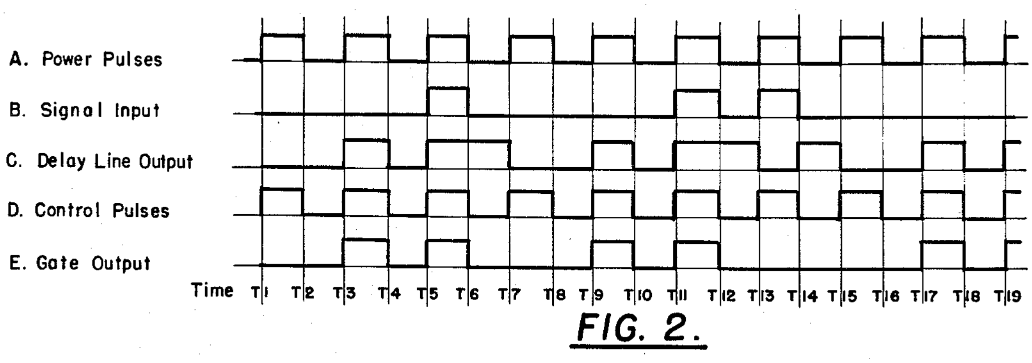
Figure 2 (A through E) are waveforms illustrating the operation of the circuit shown in Figure 1.

The operation of the circuit shown in Figure 1 will become more readily apparent from an examination of the waveforms of Figure 2. If we should initially assume that the time intervals $t1$ to $t2$, $t2$ to $t3$, etc. may be represented broadly as a time interval T, the delay line 10 is so arranged that, in the absence of an input signal, it presents a total delay of 2T; and in the presence of an input signal this delay is decreased to a time of T. Thus, in the absence of a signal input, a power pulse from the source 11, coupled to the input of delay line 10, during a time interval $t1$ to $t2$ for instance, is propagated down the line and appears at the output of the said line, during a time interval $t3$ to $t4$ for instance (Figure 2C). Similarly, a next subsequent power pulse coupled to the delay line, during a time interval $t3$ to $t4$ for instance, will, in the absence of an input signal, appear at the output of the said line, during a time interval $t5$ to $t6$.

If, now, a signal input should be coupled from the source 15 via the pulse stretcher 16 to the delay line 10, during a time interval $t5$ to $t6$, the time delay of the line 10 will be halved, whereby the input power pulse occurring during the time interval $t5$ to $t6$, will now appear at the output of the delay line 10, during a time interval $t6$ to $t7$. Inasmuch as the control pulses coupled from the source 13 to the gate 12 occur in synchronism with the power pulses coupled from the source 11 to the line 10, the foregoing assumed pulse sequence will find a coincidence of input pulses at the gate 12 during the time intervals $t3$ to $t4$, and $t5$ to $t6$, whereby output pulses will be passed to the point 14 during these time intervals. However, because of the application of the input pulse during the time interval $t5$ to $t6$, the delay line output pulse corresponding to the input power pulse occurring during the time interval $t5$ to $t6$, no longer occurs in synchronism with a control pulse coupled to the gate 12, whereby no output appears at the terminal 14 during the time interval $t7$ to $t8$. If a further signal input pulse is not coupled to the line, during a time interval $t7$ to $t8$, the line will again pass an output pulse during the time interval $t9$ to $t10$ in synchronism with a control pulse coupled to the gate 12, whereby a still further output pulse will appear during this time interval $t9$ to $t10$ at the terminal 14. A further operating sequence is shown for the time interval $t11$ to $t19$, wherein it is assumed that two successive signal input pulses are applied from the source 15 to the delay line 10.

Comparing now the waveforms of Figures 2B and 2E, it will be noted that the system operates to provide regularly occurring pulses at the output point 14 in the absence of an input signal from the source 15; and the application of such a signal input pulse serves to inhibit an output at the terminal 14. The over-all system shown in Figure 1 thus operates broadly as a complementing type amplifier. The function of pulse stretcher 16 in the above described circuit is to lengthen the input pulse sufficiently so that the stretched input will be capable of keeping the line 10 delay time at its halved value until the entire power pulse has passed through the said delay line.

The foregoing description has assumed that the control pulses (Figure 2D), occur in synchronism with the power pulses (Figure 2A), and this assumption has resulted in the system acting as a complementing type amplifier. Thus, outputs occur in the absence of inputs, and the coupling of a signal input to the system inhibits an output from the system. As will become readily apparent from the foregoing discussion, however, the gate control pulses (Figure 2D), may be phase shifted, whereby they occur in the time intervals intermediate the application of power pulses from the source 11 to the delay line 10. Under the same assumed pulse conditions, therefore, this shift in control pulse will result in the system producing no outputs in the absence of a signal input, and in the production of outputs only after a signal input has been applied to the delay line. This variation in pulse timing will therefore result in the system acting as a non-complementing amplifier, wherein no output is obtained in the absence of a signal input thereto.

As was mentioned previously, the particular embodiment of the present invention shown and described in reference to Figure 1 relies upon the concept that the application of a controlling signal input to the variable delay line reduces the inductance of the said delay line, thereby decreasing its delay time. The system may also be arranged, however, to utilize a variable delay line wherein the application of a controlling signal thereto increases the inductance of the line, thereby increasing its delay time; and the various concepts discussed previously may be utilized in accordance with this still further embodiment of the present invention.

Figure 3:
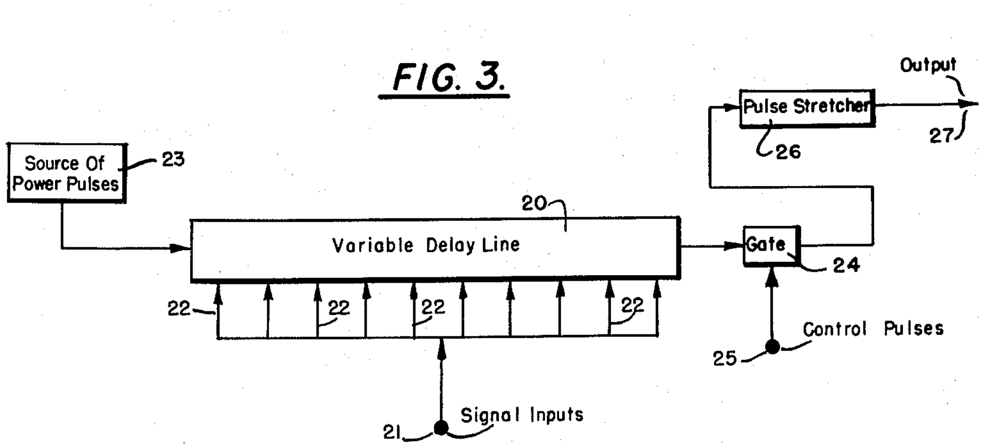
Figure 3 is a schematic diagram of a delay line amplifier constructed in accordance with a further embodiment of the present invention.

Thus, referring to Figure 3, a delay line 20 may be provided, the characteristics of which are that its delay time (and inductance, for instance) is increased by the coupling of a signal input from a source 21 via a plurality of control input points 22 to the said line. Once more, a source of regularly occurring power pulses 23, of the type shown in Figure 4A for instance, is coupled to the input of the variable delay line 20 and the output of the said delay line is coupled to an input of a permissive gate 24 which is once more power operated by a source of regularly occurring control pulses 25 taking the configuration shown in Figure 4D. The output of gate 24 is then coupled to a pulse stretcher 26, whereby system outputs appear selectively at the output terminal 27.

Figure 4:
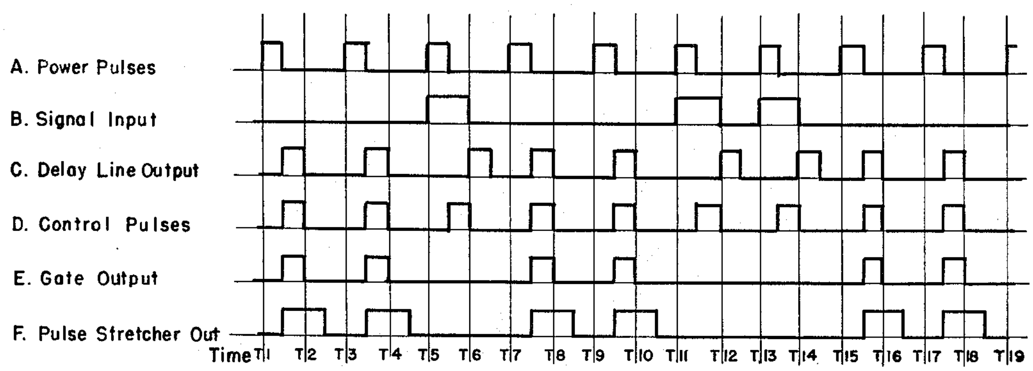
Figure 4 (A through F) are waveforms illustrating the operation of the circuit shown in Figure 3.

Examining the waveforms of Figure 4, the operation of the circuit shown in Figure 3 will also become readily apparent. It will first be noted that in the particular system shown, the power pulses from source 23 have half the width of the power pulses utilized with the system of Figure 1. Thus, utilizing the nomenclature used with the circuit of Figure 1, the power pulses of the source 23 have a width equal to or slightly greater than T/2. The control pulses coupled from the source 25 to the gate 24 have a width T/2, and the power pulses and control pulses are phase shifted with respect to one another to occur during alternate half portions of a given time interval T. The delay line 20 is arranged to present a normal delay time of T/2 in the absence of an input from source 21, and presents an increased delay time of T with a signal input thereto. The signal inputs from the source 21 to the line 20 have a pulse width T, as was the case in the arrangement of Figure 1, but because of the decreased width of both the power pulses and the control pulses, the output of gate 24 comprises pulses having widths T/2. The pulse stretcher 26 is therefore provided to double the width of the gate output pulse, whereby pulses appearing at the terminal 27 have a total width T, this particular pulse width being adopted to conform with the ultimate pulse width output of the system shown in Figure 1.

Examining now the waveforms of Figure 4, it will be noted that power pulses from the source 23 are regularly applied to the delay line 20 during the first half portions of the time intervals $t1$ to $t2$, $t3$ to $t4$, $t5$ to $t6$, etc. Similarly, control pulses are regularly applied from the source 25 to the gate 24 during the second half portions of the time intervals $t1$ to $t2$, $t3$ to $t4$, $t5$ to $t6$, etc. and it will be understood that again a single pulse source may be utilized to provide both the power pulses and the control pulses, provided now that a phase shift device or other delay means is inserted between the output of such a single source and the control pulse input to gate 24. Inasmuch as the normal delay time of the line 20, in the absence of a signal input thereto, is T/2, power pulses from the source 23 coupled to the line 20 during the first half portions of the time intervals t1 to t2 and t3 to t4, will be propagated down the line and will appear at the output of the said line during the second half portion of the said time intervals t1 to t2 and t3 to t4. Thus, the output of the delay line 20, during these time intervals, occurs in synchronism with control pulses from the source 25 whereby gate 24 passes outputs during the second half portions of the time intervals t1 to t2 and t3 to t4. These outputs are in turn applied to the input of pulse stretcher 26 whereby system output pulses appear at the terminal 27, as shown in Figure 4F, having a pulse width of T.

If now a signal input should be coupled from the source 21, during the time interval t5 to t6, the delay time of the line 20 will be increased from T/2 to T, whereby a power pulse coupled to the said line 20, during the first half portion of the time interval t5 to t6, will be propagated down the line 20 and will appear at the output thereof during the first half portion of the time interval t6 to t7. The output of delay line 20 is therefore no longer in synchronism with a gate control pulse from the source 25, whereby the gate 24 will not pass an output. In the absence of a further signal input, the system will revert to its former operating condition, whereby the gate 24 will pass output pulses during the second half portions of the t7 to t8 and t9 to t10 time intervals. A still further operating sequence has been shown for the time interval t11 to t19, wherein it is assumed that two successive signal inputs are coupled from the source 21 to the delay line 20 and, again, the operation of the system will become apparent from an examination of these waveforms.

It should be noted that the particular arrangement shown in Figure 4 again acts as a complementing type amplifier, inasmuch as outputs appear from the system in the absence of a signal input thereto, and such system outputs are suppressed by the presence of a signal input. Again, however, the system may be modified to act as a non-complementer, and in this particular case, the control pulses may be shifted to occur during the first half portions of the time intervals t2 to t3, t4 to t5, t6 to t7, etc. The particular time representations in respect to the notation T, are, of course, arbitrarily chosen, but again, as was the case in the arrangement of Figure 1, the signal input pulse from the source 21 has a width of substantially twice that of the power pulses from the source 23, so that the signal input pulse can once more keep the delay line's delay down until the entire power pulse has passed through the said delay line.

Again, it will be noted that the delay time of the delay line, with a signal input applied, has been chosen to just equal the length of time T for which the signal input lasts, in the arrangements of both Figure 1 and Figure 3. This particular consideration is not mandatory, however, and other relationships may be employed. Moreover, in the system of Figure 3 for instance, it will be noted that the time that gate 24 is open is accurately controlled by the pulses from the source 25. If a separate source should be utilized to provide the power pulses, these power pulses need not have a width limited to T/2 and may in fact extend into the second half portion of their respective time intervals without impairing the proper operation of the device.

To summarize the foregoing, it will be seen that systems operating in accordance with the principles of both complementing and non-complementing type amplifiers, may be effected by the combintaion of a variable delay line, a source of regularly occurring energization coupled to that delay line, and a utilization circuit coupled to the output of the said delay line, which utilization circuit is capable of accepting a signal only during predetermined time intervals. Inasmuch as the system relies mainly upon the provision of a variable delay line, however, certain forms of such delay lines which may be employed in the practice of the present invention, will now be discussed, it being understood, of course, that these delay lines will be interconnected with the remainder of the circuit shown in Figures 1 and 3.

Figure 5A:
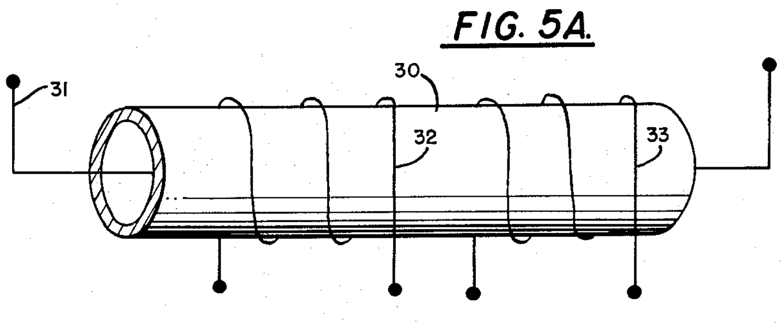
Figures 5A and 5B represent transverse type variable inductors which may be utilized as sections of a variable delay line in accordance with the present invention.

As was mentioned in the preceding discussion, the variable delay lines of the present invention rely on the principle that they include inductances which are either decreased or increased in value in response to a signal input applied thereto. One form of component acting in accordance with the preceding principle, is shown in Figure 5A, and this particular device is termed a "transverse type variable inductor." In the particular embodiment shown in Figure 5A, such an inductor may comprise a magnetic core 30, taking the configuration of a hollow cylinder, this core being fabricated of a magnetic material such as a ferrite. The core 30 carries a first coil 31 thereon disposed axially of the core, and carries two further coils 32 and 33 disposed circumferentially of the core. It will be seen therefore that by this disposition, current flowing through the winding 31 will effect a magnetization of the core 30 in a direction transverse to that caused by current flowing in the windings 32 and/or 33. The device is thus characterized by the provision of a magnetic core having two windings capable of effecting a magnetization in one direction and a third winding capable of effecting a further magnetization in a transverse direction. The winding 31 forms the circuit of the controlled inductance when employed as an element of a variable delay line, and in practice, the power pulses mentioned previously will be coupled to this winding 31. The winding 32 acts as a bias winding, and in practice, a source of bias current will be coupled to this winding for maintaining the core 30 continually saturated in a first direction. The winding 33 acts as a control winding and the signal inputs mentioned previously are coupled to this winding 33 when the component is employed in a variable delay line.

In operation, if signal current coupled to the winding 33 aids the bias current in the winding 32, the inductance seen by the winding 31 will be diminished. Thus, although core 30 is continually saturated in one orientation by the bias current in winding 32, the core 30 nevertheless presents an inductance to the winding 31 which may be quite high, inasmuch as the H field produced by current in the winding 31 acts everywhere in a direction transverse to that of the biasing field. Furthermore, this inductance presented to winding 31 is inversely proportional to the magnitude of the bias so that when signal current coupled to winding 33 aids the bias, the over-all inductance seen by winding 31 is decreased. By the same analogy, however, it should be noted that if the bias current passed through winding 32 is initially of a sufficiently large value so that signal currents in a direction opposing that of the bias field, and coupled to the winding 33, still keep the core 30 well saturated in a first direction, the application of such an opposing signal current to the winding 33 will result in an increase in the inductance seen by the winding 31. The component of Figure 5A thus provides a variable iductance device which is responsive to signal inputs for presenting either an increased or decreased inductance, and, therefore, such a component may be utilized as an element of the delay lines discussed in reference to both Figures 1 and 3.

Figure 5B:
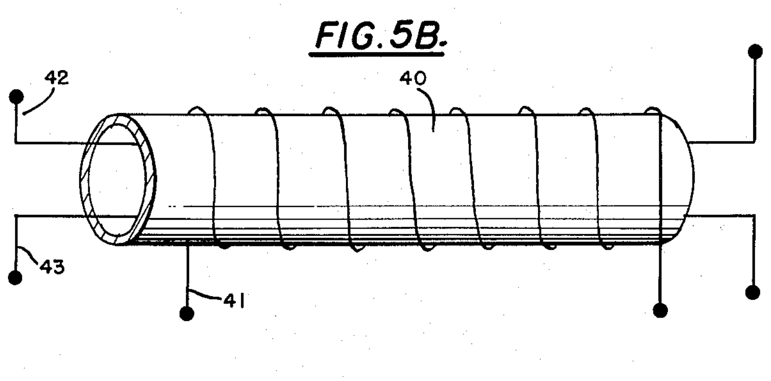

A further possible embodiment of this form of inductance is shown in Figure 5B, and the preceding discussion applies with equal force to this form of the invention. Thus, a variable inductor, in accordance with the present invention, may comprise a magnetic core 40, again formed of a ferrite tube, and the said core 40 may carry a first winding 41 thereon in a circumferential direction, and may carry two further windings 42 and 43 in a longitudinal direction. As before, the system thus employs two windings in a first direction and a third winding in a direction transverse to said first direction, whereby the device may act in accordance with the preceding theories of operation. The winding 41 once more forms the circuit of the controlled inductance, the winding 42 may comprise a bias winding for keeping the core continually saturated, and the winding 43 acts as a controlling winding to which signal current either aiding or opposing the bias current may be applied, depending upon the particular inductance change characteristics desired of the component.

Figure 6:
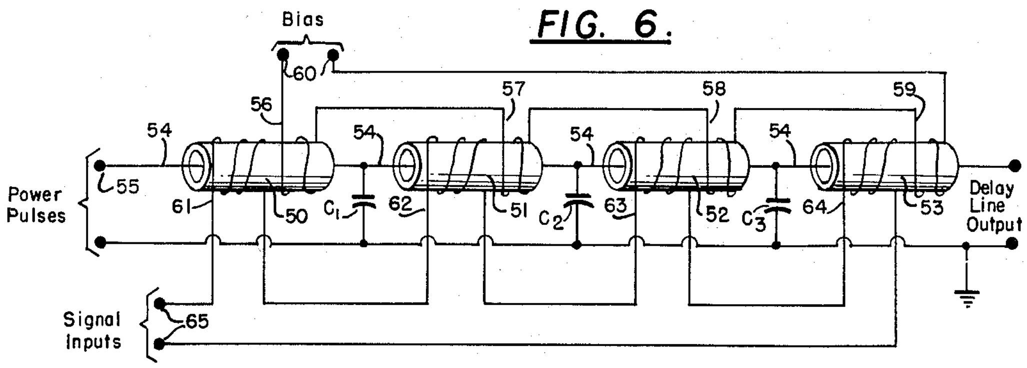
Figure 6 is an illustrative diagram of a variable delay line utilizing transverse inductor sections of the type shown in Figure 5A.
Figure 7:
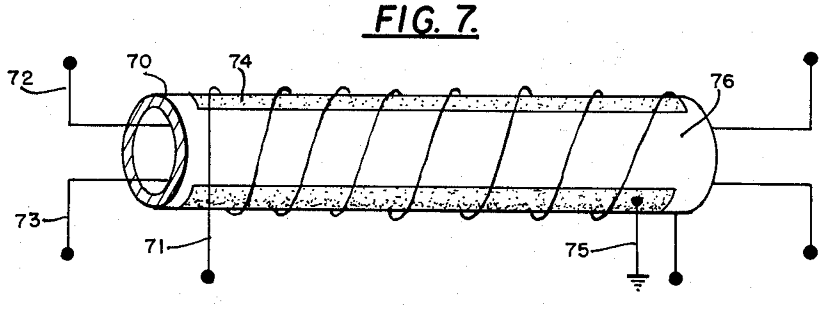
Figure 7 is a continuous delay line which may be employed in the practice of the present invention.

Figure 6 discloses a variable delay line utilizing plural lumped sections employing components of the type shown and discussed in Figure 5A. Thus, such a delay line may employ a plurality of tubular cores 50, 51, 52, 53, etc. and these cores may each carry a first winding 54 in a longitudinal direction, to which winding a source of power pulses 55 may be coupled. The several windings 54 are further linked by capacitive elements C1, C2, and C3 to ground, as shown, thereby to provide an LC delay line section analogous to those of known configuration. The several cores carry circumferential windings 56, 57, 58, and 59 coupled to a bias source 60 capable of maintaining the said cores in a state of continual saturation in a predetermined direction; and the said cores also carry further circumferential windings 61, 62, 63 and 64 coupled to one another and to a source of signal inputs 65. As will be appreciated from the foregoing discussion, if a signal from the source 65 passes a current through the several windings 61, 62, 63 and 64 in a direction aiding that of the bias current, the over-all inductance of the delay line will be decreased and the delay time of the line will similarly be decreased. On the other hand, if the signal currents should oppose the bias currents, the inductance and delay time of the line will be increased. This system may therefore be employed in the arrangements of Figures 1 and 3 to provide the complementing and non-complementing operation thereof.

The foregoing transverse inductor principles may also be utilized in the provision of a continuous delay line rather than in a lumped parameter delay line, and such a continuous delay line is shown in Figure 7. Once more, a ferrite tube 70 may be employed having an input winding 71 circumferentially disposed thereon, and a bias winding 72 and a controlling winding 73, longitudinally disposed thereon. In these respects the continuous delay line of Figure 7 corresponds to the lumped section of Figure 5B. The said continuous delay line further has a conductive coating 74 thereon, which may be formed, for instance, of a silver paint, and this coating is grounded at a point 75 and further defines an elongated slit 76 to prevent the flow of eddy currents. In operation, the distributed capacity between winding 71 and the grounded conductive coating 74 performs the function of the several capacitors C1, C2, and C3 shown in Figure 6, the variable inductance consideration remaining as before. Thus, the component of Figure 7 provides a continuous delay line comprising a variable inductance and distributed capacity, and such a device may be employed in the arrangements of Figures 1 and 3.

Figure 8:
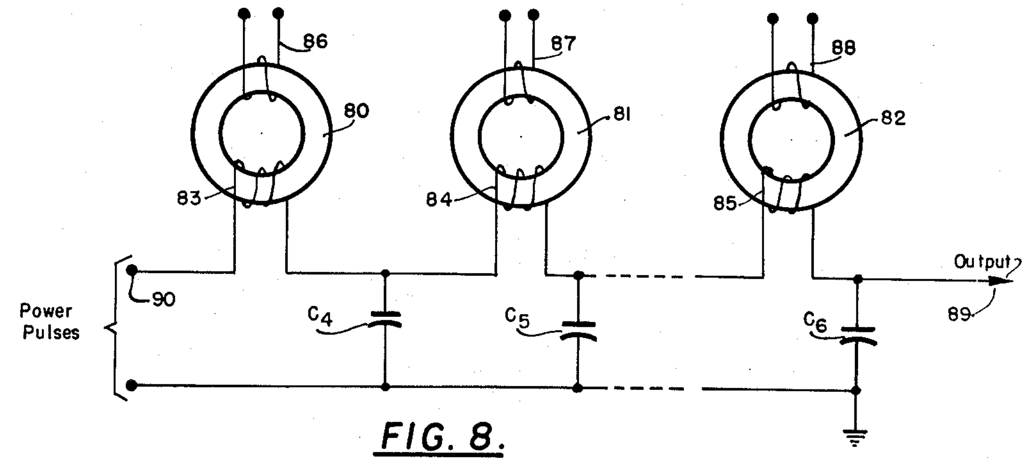
Figure 8 is a further lumped delay line such as may be utilized in the present invention.

A still further delay line form is shown in Figure 8, and this particular delay line is of the usual circuit design, comprising inductors and capacitors, but has the normally provided linear inductors replaced by windings on rectangular hysteresis loop magnetic cores. Thus, the delay line comprises a plurality of cores 80, 81, 82, etc. which may preferably but not necessarily be formed of materials exhibiting a substantially rectangular hysteresis loop such as Orthonik and 4–79 Moly-permalloy. These cores respectively carry a power winding 83, 84, 85 thereon, and the several power windings are connected to one another as shown. The cores further carry controlling or reset windings 86, 87 and 88 thereon, which may be coupled to pulse sources serving to regularly reset the cores in accordance with the subsequent discussion. The several delay line sections further include shunt capacitors C4, C5, C6, etc. connected to ground; and outputs appear at a terminal 89 after a predetermined and variable delay time subsequent to the application of power pulses from a source 90.

In operation, the power windings 83, 84 and 85, present a relatively high impedance to pulses applied thereto when their corresponding cores are caused to operate over substantially vertical portions of their respective hysteresis loops; while, on the other hand, the said power windings present a relatively low impedance to pulses applied thereto when the said corresponding cores are caused to operate on relatively horizontal portions of their hysteresis loops. Thus, if we should initially assume that each of the cores 80, 81 and 82 is at its minus remanence operating point, a power pulse from the source 90 will first be coupled to the power winding 83, driving the core 80 from its said minus remanence operating point into positive saturation. The core 80 will therefore be flipped and the winding 83 will then present a low impedance to current traveling in the forward direction of the line, whereby capacitor C4 will rapidly charge up to the input voltage of the power pulse. This potential across capacitor C4 will then act upon the next section of the line comprising the core 81 and the winding 84, flipping this second core 81 and again thereafter passing current to the capacitor C5. Thus, by the disposition shown in Figure 8, the application of a power pulse from the source 90 causes each section of the delay line to flip from its minus remanence point to its plus remanence point during successive time intervals; and inasmuch as each flipping operation introduces a time delay in the propagation of the input voltage, the over-all system acts as a delay line.

The several reset windings 86, 87, 88, etc. may be coupled to pulse sources so timed that they revert their corresponding cores 80, 81, 82, etc., to their corresponding minus remanence operating points subsequent to the passage of a power pulse current through the power winding thereof. If this reverting function of the windings 86, 87, and 88 should be inhibited, however, or if the reverting function of selected ones of these windings should be so inhibited, the corresponding delay line sections will not present the flipping delay, discussed previously, to the next subsequent power pulse. Thus, by proper control of the core reversions, the total time of delay of the variable delay line may be correspondingly controlled. In the particular examples discussed in reference to Figures 1 and 3, this controlling effect may be performed by the signal input which may in turn serve to oppose the reverting function of the separate pulse sources applied to selected ones of the reverting windings 86, 87, and 88, thereby to change the delay time of the line accordingly.

While I have described preferred embodiments of the present invention, many variations will suggest themselves to those skilled in the art. Thus, while the examples of Figures 1 and 3 have propagated power pulses down the variable delay line, while control pulses are fed to the gate utilized, it should be noted the functions of the control and power sources may be interchanged, and the inputs to the gate reversed, whereby the gate control pulses rather than the power pulses are subject to the variable delay. This particular modification of the present invention is, in fact, of considerable importance, for instance where the two inputs to the gate do not act symmetrically on the gate. This may occur, for instance, where one of the inputs to the gate is restricted by the design of the gate circuit to have only a latent or potential effect on the final output from the gate. Even further modifications will become apparent from the foregoing description, and all such variations as are in accord with the principles of the present invention are therefore meant to fall within the scope of the appended claims.

Having thus described my invention, I claim:

1. A pulse control system comprising a variable delay line, power means coupled to the input of said delay line for regularly propagating pulses down said line, utilization means coupled to the output of said delay line for accepting pulses coupled thereto during predetermined spaced time intervals, and control means coupled to said delay line for selectively changing the delay time thereof.

2. The pulse control system of claim 1 wherein said delay line includes a variable inductance, said delay line being responsive to a control signal from said control means for selectively increasing the magnitude of said inductance thereby to increase the delay time of said delay line.

3. The pulse control system of claim 1 wherein said delay line includes a variable inductance, said delay line being responsive to a control signal from said control means for selectively decreasing the magnitude of said inductance thereby to decrease the delay time of said delay line.

4. In a control system, a delay line, means coupling signals to the input of said line during predetermined time intervals, a utilization circuit coupled to the output of said line and selectively responsive to signals at said output during further predetermined time intervals, and control means for selectively changing the delay time of said delay line.

5. In a control system, a delay line including a plurality of variable impedances, control means coupled to said delay line for changing the magnitude of said impedances thereby to vary the delay time of said line, means coupling signals to an input of said delay line, and a utilization circuit responsive to signals appearing at an output of said delay line during predetermined time intervals.

6. The control system of claim 5 wherein said means coupling signals to the said input of said delay line comprises a source of regularly occurring power pulses, said utilization circuit comprising a permissive gate, and means coupling control signals to said gate to open said gate during said predetermined time intervals.

7. In a control system, a variable delay line, means selectively coupling first control signals to said delay line to vary the time delay of said line, said delay line having a time delay of substantially 2T in the absence of said control signal, and having a time delay of substantially T in the presence of said control signal, means coupling regularly occurring pulses of pulse width substantially T to the input of said delay line, a power operated gate coupled to the output of said delay line, and means coupling second regularly occurring control signals of pulse width substantially T to said gate to open said gate during predetermined time intervals.

8. The system of claim 7 wherein said second regularly occurring control signals occur in synchronism with said regularly occurring pulses, whereby said system acts as a complementer.

9. The system of claim 7 wherein said second regularly occurring control signals occur in time intervals intermediate said regularly occurring pulses, whereby said system acts as a non-complementer.

10. The system of claim 7 wherein said first control signals comprise pulses having a time width of substantially T, and means coupling said first control signals to said variable delay line with the leading edge of a said first control signal coinciding with the leading edge of one of said regularly occurring pulses.

11. The system of claim 10 wherein said last-named means includes pulse stretcher means for increasing the pulse width of said first control signals to substantially 2T.

12. In a control system, a variable delay line, means selectively coupling first control signals to said delay line to vary the time delay of said line, said delay line having at time delay of substantially T/2 in the absence of said control signal, and having a time delay of substantially T in the presence of said control signal, means coupling regularly occurring pulses of pulse width substantially T/2 to the input of said delay line, and utilization means coupled to the output of said delay line, said utilization means being responsive to signals at the output of said delay line during spaced regularly occurring intervals of time length substantially T/2.

13. The system of claim 12 wherein said utilization means comprises a power operated gate, and means coupling further regularly occurring pulse control signals of pulse width substantially T/2 to said gate.

14. The system of claim 13 including a pulse stretcher coupled to the output of said gate.

15. In a control system, a delay line comprising a plurality of magnetic cores, each of said cores having first and second windings thereon, means serially coupling each of said first windings to one another, signal control means coupled to each of said second windings for selectively varying the inductances of said first windings, means coupling pulse signals to one end of said serially connected first windings, and a utilization circuit coupled to the other end of said serially connected first windings, said utilization circuit being selectively responsive to signals occurring during predetermined time intervals.

16. The control system of claim 15 wherein said first and second windings are disposed transverse to one another on each of said cores.

17. The control system of claim 16 including a third winding on each of said cores transverse to the said first winding thereon, and a source of bias current coupled to each of said third windings for maintaining the said cores in a continual saturation state in a predetermined orientation.

18. In a control system, a delay line including a pulse responsive variable inductance, pulse means coupled to said inductance for selectively changing the magnitude of said inductance thereby to vary the delay time of said line, means coupling signals to an input of said delay line, and a utilization circuit responsive to signals appearing at an output of said delay line during predetermined time intervals.

19. The control system of claim 18 wherein said means coupling signals to said delay line input includes a source of regularly occurring power pulses for regularly propagating signals down said delay line.

20. A pulse control system comprising a variable delay line, signal means coupled to said delay line for selectively changing the delay time of said line, a first pulse source coupled to one end of said delay line, a gate having a first input terminal thereof coupled to the other end of said delay line whereby pulses from said first source arrive at said first input terminal at times dependent upon said signal means, and a second pulse source coupled to a second input terminal of said gate whereby said gate selectively produces an output in response to the substantially simultaneous occurrence of pulses at its first and second terminals.

No references cited.